US008900397B2

(12) United States Patent
Nagasaka et al.

(10) Patent No.: US 8,900,397 B2
(45) Date of Patent: Dec. 2, 2014

(54) APPARATUS FOR MANUFACTURING JOINED LAMINATED MEDIA AND METHOD OF MANUFACTURING JOINED LAMINATED MEDIA

(75) Inventors: Masahiko Nagasaka, Shinshiro (JP); Shogo Nakajima, Shinshiro (JP); Takayuki Nozawa, Shinshiro (JP); Osamu Sugino, Shinshiro (JP); Ikuto Mishima, Toyokawa (JP)

(73) Assignee: I. Sintokogio, Ltd., Nagoya-Shi (JP)

( * ) Notice: Subject to any disclaimer, the term of this patent is extended or adjusted under 35 U.S.C. 154(b) by 6 days.

(21) Appl. No.: 13/882,417

(22) PCT Filed: Nov. 28, 2011

(86) PCT No.: PCT/JP2011/006607
§ 371 (c)(1),
(2), (4) Date: Jul. 10, 2013

(87) PCT Pub. No.: WO2012/077292
PCT Pub. Date: Jun. 14, 2012

(65) Prior Publication Data
US 2013/0276975 A1    Oct. 24, 2013

(30) Foreign Application Priority Data

Dec. 6, 2010    (JP) ................................. 2010-271494

(51) Int. Cl.
*B32B 37/00*     (2006.01)
*B32B 37/10*     (2006.01)
*B30B 5/06*      (2006.01)

(52) U.S. Cl.
CPC ............... *B32B 37/1027* (2013.01); *B30B 5/06* (2013.01); *B32B 2457/18* (2013.01); *B32B 2309/68* (2013.01)
USPC ........ 156/308.2; 156/498; 156/555; 156/582; 156/583.5

(58) Field of Classification Search
USPC .............. 156/228, 285, 286, 308.2, 498, 555, 156/580, 582, 583.1, 583.5
See application file for complete search history.

(56) References Cited

U.S. PATENT DOCUMENTS

| 4,402,785 | A |   | 9/1983 | Withers |
|-----------|---|---|--------|---------|
| 4,997,507 | A |   | 3/1991 | Meyer |
| 5,536,356 | A | * | 7/1996 | Stuerzel ........................ 156/514 |
| 6,227,271 | B1| * | 5/2001 | Pourmand et al. ............ 156/498 |
| 6,699,354 | B2| * | 3/2004 | Schwenk et al. .............. 156/311 |

FOREIGN PATENT DOCUMENTS

| EP | 0 344 765 | 12/1989 |
| JP | 1-232042  | 9/1989 |

(Continued)

OTHER PUBLICATIONS

English-language International Search Report from European Patent Office for International Application No. PCT/JP2011/006607, Mailed Apr. 24, 2012.

*Primary Examiner* — James Sells
(74) *Attorney, Agent, or Firm* — Finnegan, Henderson, Farabow, Garrett & Dunner, L.L.P.

(57) ABSTRACT

The present invention is to provide an apparatus to manufacture joined laminated media and a method therefor. The joined laminated media that are manufactured from the membrane materials and that are joined by being pressed have no displacement, deformation of the membrane materials, or any defect in joining the boundary faces of the laminated materials, and are efficiently manufactured in a good yield. The apparatus can manufacture a joined laminated-media where the laminated media are placed in the housing space (S) that is formed by a pair of endless belts (15a, 15b) and the sealing member (24). The laminated media are then transported in a state where the laminated media are fixed by the pair of endless belts (15a, 15b) that are closely attached to the laminated media because the air is discharged from the housing space (S) through the discharge holes (17) and they are joined by being pressed in the hot-press section (11) and cold-press section (13).

13 Claims, 6 Drawing Sheets

(56) References Cited

FOREIGN PATENT DOCUMENTS

| | | |
|---|---|---|
| JP | 2005-19275 | 1/2005 |
| JP | 2008-146833 | 6/2008 |
| JP | 2008-159377 | 7/2008 |
| JP | 2010-514102 | 4/2010 |
| JP | 2010-198948 | 9/2010 |

* cited by examiner

Fig. 1

Fig. 2 cross sectional view of
Fig. 1 (A) at line G-G

(A) cross-sectional view of Fig.1 (A) at line D-D (B) cross-sectional view of Fig.1 (A) at line E-E (C) cross-sectional view of Fig.1 (A) at line F-F

APPARATUS FOR MANUFACTURING JOINED LAMINATED MEDIA AND METHOD OF MANUFACTURING JOINED LAMINATED MEDIA

TECHNICAL FIELD

This invention relates to an apparatus for manufacturing joined laminated media and a method of manufacturing the joined laminated media where the joined laminated media, such as a membrane electrode assembly for a polymer electrolyte fuel cell, that are manufactured from membrane materials are joined by being pressed after they are stacked in layers.

TECHNICAL BACKGROUND

Conventionally to manufacture joined laminated media by joining the laminated media of membrane materials by pressing them, a roll-type press is used where the laminated media are transported and then inserted between the rolls that are opposed to each other. Recently this technology has been used to manufacture a Membrane-Electrode Assembly (hereafter, MEA) for a polymer electrolyte fuel cell, which is produced by stacking in layers a polymer electrolyte, a fuel electrode membrane, and an air electrode membrane, and joining them (for example, see Patent Document Nos. 1, 2, and 3).

For the method of manufacturing the joined laminated media mentioned above, when the laminated media of the polymer electrolyte, the fuel electrode membrane and the air electrode membrane were joined by being pressed, the displacement and deformation of the membrane materials were apt to occur and hence to lower the yield of the product. This is because an abrupt change of the force on the laminated media occurred or a friction between the laminated media and rolls was caused when laminated media passed through the rolls. Also, if air were left in the space between the laminated membrane materials, to discharge sufficient air from the space was difficult. Thus laminated media having defects in the joined boundary faces would be produced.

To solve this problem, a method to fix the laminated media and hold it in that state is proposed wherein the laminated media are disposed on the upper surface of a flexible sheet that is attached to a metal frame for fixing a sheet. On top of the metal frame for fixing a sheet, a sheet having the flexible sheet and an annular packing overlaps the metal frame. Then from a air-tight space formed by these components the air is discharged by having the closed space depressurized (For example, Patent Documents Nos. 4 and 5).

DESCRIPTION OF RELATED ART

Patent Documents

1. Publication of Japanese patent application, Publication No. 2008-159377
2. Publication of Japanese patent application, Publication No. 2010-514102
3. Publication of Japanese patent application, Publication No. 2010-198948
4. Publication of Japanese patent application, Publication No. 2005-19275
5. Publication of Japanese patent application, Publication No. 2008-146833

SUMMARY OF THE INVENTION

Problem to be Solved by the Invention

However, in each of the inventions of References 4 and 5, a fixed metal frame for fixing a sheet must be prepared for each set of laminated media, and joining the laminated media is carried out after the spaces that house the laminated media are individually depressurized. So, the tact time is inevitably prolonged. Also, the thickness of the fixed metal frame for fixing a sheet is greater than that of the laminated media such that a continuous press that is suitable for mass production of the laminated media such as a roll-type press or a double-belt-type press cannot be used. Thus an efficient production of the laminated media cannot be carried out.

To solve these problems, the present invention is to provide an apparatus to manufacture joined laminated media and the method to manufacture the joined laminated media wherein the joined laminated media that are manufactured from the membrane materials and that are joined by being pressed, having no displacement or deformation of the membrane materials or having no defect in joining the boundary faces of the laminated materials, are efficiently manufactured and in a good yield.

Means to Solve Problem

To achieve the purpose of solving the problems, an apparatus for manufacturing joined laminated media by joining layers of membrane materials by pressing them (first invention) comprises the following:

a pair of endless belts that transport the laminated media that are sandwiched between the belts;

pressing devices that are disposed at positions that are opposed to and that sandwich the pair of the endless belts, the pressing device giving a pressing force by pressing the endless belts on the laminated media that are transported by the endless belts;

a housing section which is a compartmentalized space formed between the endless belts that are opposed to each other such that the laminated media can be placed in the space;

a discharging section that protrudes in the direction of the width of the endless belt and that communicates with the housing section and that is to discharge the air from the spaces, each space being compartmentalized by the pair of endless belts and the housing section;

a sealing member that comprises a plurality of the housing sections and discharging sections that are in a line running in the direction of the movements of the endless belts, which sealing member is formed on at least one of the pair of the endless belts, and a discharging member that discharges the air from the housing space through a hole for a discharge, the hole for a discharge being formed through the endless belt at the position corresponding to the discharging section, wherein the holes for a discharge are in a line running in the direction of the movements of the endless belts and outside the pressing devices in the width direction of the endless belts, and wherein the discharging member covers the holes for a discharge by contacting the side of the endless belt which side is opposite to the side of the sealing member, the discharging members being disposed at such positions that the air in the housing space can be kept to be discharged at least for the area where the laminated media are pressed by the pressing devices, and wherein the pair of endless belts are fixed firmly to the laminated media that are disposed in the housing space by having the air in the housing space discharged by the discharging member through the hole for a discharge, and the laminated media are transported in a fixed position and can be pressed by the pressing devices (the first invention).

According to the first invention the apparatus for manufacturing joined laminated media can manufacture joined laminated media wherein the laminated media that are made of the layers of membrane materials are placed in the housing space that is formed by a pair of endless belts and the sealing member. The laminated media are then transported in a state wherein the laminated media are fixed by the pair of endless belts that are closely attached to the laminated media because the air is discharged from the housing space through the holes for a discharge and they are joined by being pressed by the pressing device. In this way the laminated media can be joined by being pressed in a state where the air in the housing space is discharged and the laminated media, consisting of layers of membrane materials, are closely attached and fixed. So, the joined laminated media that have no displacement or deformation of the membrane materials, and that have no defect in the joined boundary faces of the laminated media, can be manufactured in a good yield.

The apparatus for manufacturing joined laminated media of the first invention, while adopting a method of pressing and joining the laminated media that are kept fixed because the air in the housing space is being discharged, does not need to separately prepare or use a fixed frame to keep the housing space in a vacuum state, which would be required in the conventional apparatus for manufacturing joined laminated media. So, a continuous press that is suitable for mass production, not a batch-type press, can be adopted, and thereby joined laminated media can be manufactured efficiently.

In the apparatus for manufacturing joined laminated media of the first invention, a first pressing member is disposed along the discharging member and it gives a pressing force on the endless belt (second invention).

In the apparatus for manufacturing joined laminated media of the second invention, the first pressing member that presses the endless belt is disposed along the discharging member. So, even if the air is discharged from the housing space, the endless belt is not caused to be deformed due to sucking of the endless belts when the air is discharged, thus preventing a leakage of air, which otherwise would occur if the deformation of the endless belts were to occur and if the housing space were not kept air-tight. By using the first pressing member the air is securely discharged from the housing space and the laminated media are fixed.

In the apparatus for manufacturing joined laminated media of the second invention, the discharging member and the first pressing member are formed in one body (the third invention).

If the discharging member and the first pressing member are formed in one body, as in the third invention, the structure of the apparatus can be simplified such that the apparatus can be made smaller.

In the apparatus for manufacturing joined laminated media of any of the first, second, and third inventions, a second pressing member is disposed at the position opposite the discharging member and it gives a pressing force on the endless belt that does not have the discharging member and toward the discharging member (fourth invention).

In the apparatus of the fourth invention, the second pressing member presses the endless belt that does not have a discharging member, toward the discharging member. So, the endless belts are led to securely contact the sealing member, and are closely attached to the discharging member so that the air is securely discharged from the housing space, and thereby the laminated media can be fixed.

In the apparatus for manufacturing joined laminated media of any of the first, second, and third inventions, the sealing member is made of heat-resistant rubber material (the fifth invention).

As in the apparatus of the fifth invention, if the sealing member is made of heat-resistant rubber material such as silicon rubber, then even if the sealing member were thin, the housing space could still be formed air-tight because of the high adhesion of the rubber material. Further, even if the thin laminated media were used, they could be securely fixed because the thickness of the sealing member could be reduced. Also, an excessive force would not be applied on the laminated media because the pressure from the pressing devices would be borne by the sealing member. Also, as heat-resistant rubber material such as silicon rubber is highly resistant to heat, it can be used if the laminated media are being joined while it is heated at a high temperature.

In the apparatus for manufacturing joined laminated media of any of the first, second, and third inventions, the sealing member has such a thickness that the pressing force by the pressing devices is not substantially applied on the sealing member (the sixth invention).

The wording "not substantially applied on the sealing member" refers to the situations wherein the thickness of the laminated media is greater than that of the sealing member such that the pressing force by the pressing devices is borne entirely by the laminated media.

As in the apparatus of the sixth invention, if the sealing member has a thickness so that the pressing force by the pressing devices is not substantially applied on the sealing member, the pressing force by the pressing devices is applied entirely on the laminated media. So, the pressing force is efficiently applied on the laminated media.

In the apparatus for manufacturing joined laminated media of any of the first, second, and third inventions, the sealing member is made of material that is harder than that of the laminated media, and its thickness is such that if the pressing devices give the laminated media a pressing force, the force that is applied on the sealing member does not substantially deform the sealing member (seventh invention).

As in the apparatus of the seventh invention, if the sealing member is made of material that is harder than that of the laminated media and its thickness is formed in such a way that if the pressing devices give the laminated media a pressing force, the force that is applied on the sealing member does not substantially deform the sealing member, then the thickness of the laminated media can be the same as that of sealing member. So, a joined laminated media of a uniform thickness can be manufactured.

In the apparatus for manufacturing joined laminated media of any of the first, second, and third inventions, a spacer that lets air through is disposed in the discharging section, the spacer preventing the hole for a discharge and the discharging section from being blocked when the air from the housing space is discharged through the discharging member (eighth invention).

In the apparatus of the eighth invention, the spacer that lets air through and that is disposed in the discharging section can prevent the hole for a discharge and the discharging section from being blocked by the endless belts being sucked into the discharging section when the air from the housing space is discharged through the discharging member.

In the apparatus for manufacturing joined laminated media of any of the first, second, and third inventions, at least one of the pair of the endless belts is made of metal (ninth invention).

In the apparatus of the ninth invention, if at least one of the pair of the endless belts is made of a metal, that endless belt has the appropriate strength so that it rarely has twists or creases. Also, that endless belt has good heat conductivity, such that it can efficiently transfer the heat through the endless belt to the laminated media if the heating or cooling of the laminated media is carried out while it is pressed.

In the apparatus for manufacturing joined laminated media of any of the first, second, and third inventions, at least one of the pair of the endless belts is made of resin material (the tenth invention).

In the apparatus of the tenth invention, if at least one of the pair of the endless belts is made of resin material, and when the air is discharged from the housing space, that endless belt is likely to bend and to adhere tightly to the laminated media along their contours even if the laminated media are thick. So, the laminated media are more firmly fixed.

In the apparatus for manufacturing joined laminated media of any of the first, second, and third inventions, the pressing devices comprise a heating device that can heat the laminated media (the eleventh invention).

In the apparatus of the eleventh invention, the pressing devices comprise the heating device that can heat the laminated media such that the laminated media can be joined by being pressed while they are heated. Thus the joined laminated media that are manufactured can have a stronger joining force and thus the product that uses the joined laminated media can have an improved property.

In the apparatus for manufacturing joined laminated media of the eleventh invention, the pressing devices that have the heating device has a cooling device for cooling the laminated media downstream of the heating device as seen from the direction of the movements of the endless belts (the twelfth invention).

In the apparatus of the twelfth invention, the apparatus that has the pressing devices that have the heating device has a cooling device for cooling the laminated media downstream of the pressing device that has the heating device as seen from the direction of the movements of the endless belts. So, the laminated media that are joined at a hot-press section (the pressing device having a heating device) can be cooled while they are pressed in the cold-press section (the pressing device having a cooling device). Thus the joined laminated media that are manufactured can be cooled in shorter time and promptly be transported to the next step, thus improving the efficiency in manufacturing.

A method of manufacturing joined laminated media using the apparatus for manufacturing joined laminated media, comprises the steps of:
preparing laminated media comprising layers of membrane materials;
placing the laminated media in a housing space formed by a pair of endless belts that transport the laminated media and by a sealing member that is disposed on the surface of at least one of the pair of the endless belts and that compartmentalizes the space between the pair of the endless belts so that the space thus formed can hold the laminated media;
discharging the air in the housing space through the holes for a discharge, the holes for a discharge being formed through the endless belt on which the sealing member is disposed, thereby fixing the laminated media by having the pair of endless belts closely adhere to the laminated media, while the laminated media are being transported; and
pressing and joining the laminated media that are firmly fixed in the discharging step (the thirteenth invention).

The method of the thirteenth invention can manufacture the joined laminated media by the following steps of:
placing the laminated media in the housing space formed by a pair of the endless belts that transport the laminated media and the sealing member that is disposed on the surface of at least one of the pair of the endless belts that are opposed to each other and that compartmentalizes the space between the pair of the endless belts so that the space thus formed can hold the laminated media;
discharging the air in the housing space through the holes for a discharge, the holes for a discharge being formed through the endless belt on which the sealing member is disposed, thereby fixing the laminated media by having the pair of endless belts closely adhere to the laminated media, while the laminated media are being transported; and
pressing the laminated media that are firmly fixed in the discharging step and joining the laminated media.

In this way the laminated media made of layers of the membrane materials can be joined by having the air in the housing space discharged and by having the laminated media firmly fixed such that the joined laminated media that have no displacement between the layers of the membrane materials, deformation, or defect in joining the boundary faces can be manufactured in a high yield.

Also, the method has another advantage in that while it adopts a way to press and join laminated media into joined laminated media by having a housing space depressurized and by having the laminated media fixed, the method does not need to separately prepare or use a fixed frame that is required in a conventional technology so as to keep the housing space in a vacuum. So, the method can use, not a batch-type press, but a continuous press that is suitable for manufacturing joined laminated media in large quantity. Thus joined laminated media can be efficiently manufactured.

BRIEF DESCRIPTION OF DRAWINGS

FIG. 1(A) is a full side-view illustration of the apparatus for manufacturing joined laminated media. FIG. 1(B) is a plane view of the apparatus for manufacturing joined laminated media seen from A. FIG. 1(C) is a plane view of the apparatus for manufacturing joined laminated media seen from B. FIG. 1(D) is a plane view of the apparatus for manufacturing joined laminated media seen from C.

FIG. 3(A) is a cross-sectional illustration of the joined laminated media. FIG. 3(B) is an illustrative plane view of the joined laminated media.

FIG. 4(A) is a cross-sectional illustration of FIG. 1(A) at line D-D (a step of placing the laminated media in the housing space). FIG. 4(B) is a cross-sectional illustration of FIG. 1(A) at line E-E (a step of discharging the air from the housing space). FIG. 4(C) is a cross-sectional illustration of FIG. 1(A) at line F-F (a step of pressing and joining the laminated media into the joined laminated media).

EMBODIMENT TO CARRY OUT THE INVENTION

Based on the method of manufacturing the MEA and by referring to the drawings, the apparatus for manufacturing joined laminated media and the method of manufacturing joined laminated media are explained.

Figure 1:
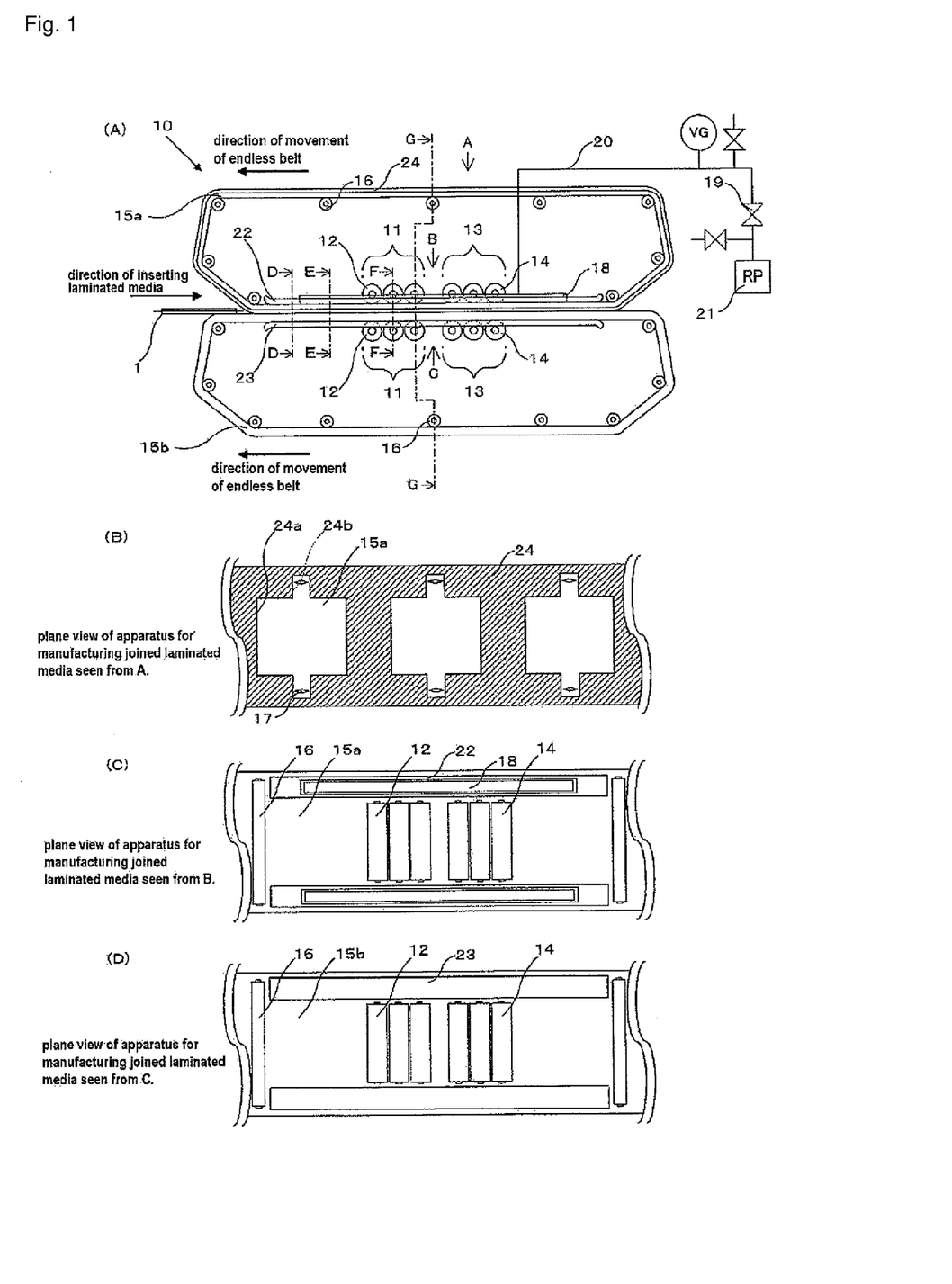
FIG. 1 is an illustration of the structure of the apparatus for manufacturing joined laminated media.

As shown in FIG. 1, the apparatus for manufacturing joined laminated media 10, which is a double-belt type press, comprises the following:

a hot-press section 11, which is a pressing device that heats and presses (hot-presses) the laminated media 1;

a cold-press section 13, which is a pressing device that presses (cold-presses) the laminated media 1 while it cools the laminated media 1 and which is disposed downstream of the hot-press section 11 as seen from the direction of the movements of the endless belts 15a, 15b;

a pair of endless belts 15a, 15b, that are opposed each other and that transport the laminated media that are sandwiched between the endless belts 15a, 15b;

a sealing member 24 that is disposed on the surface of the endless belt 15a and that forms housing spaces S by compartmentalizing the space formed by and between the endless belts 15a, 15b that are opposed to each other so that the housing spaces can house the laminated media; and discharging members 18 that contact the endless belt 15a from the inner side of the endless belt 15a and that discharge the air from the housing spaces S through the holes for a discharge 17 that are disposed on the endless belt 15a.

The endless belts 15a, 15b are supported by and driven by guide rollers 16 and they are moved in the same direction in the area where they are disposed opposite each other. The endless belts 15a, 15b transport the laminated media 1 while they convey the pressing forces of the rollers for hot-press 12 and rollers for cold-press 14 to the laminated media 1. Also, they transfer the heat between (1) the rollers for hot-press 12 and the rollers for cold-press 14 and (2) the laminated media 1.

The endless belts 15a, 15b are each formed to have an annular shape, made of material in a band-shape having a flexible property. In the present embodiment, the endless belt 15a is made of metal, which is stainless steel, and the endless belt 15b is made of a resin material, which is Teflon (registered trademark).

The upper and lower parts of the hot-press section 11 are each disposed opposite each other, while having the endless belts 15a, 15b placed in-between. The hot-press section 11 and the cold-press section 13, by pressing the endless belts 15a, 15b, exert a pressing force on the laminated media 1 that are transported by the endless belts 15a, 15b. Such is the same with the upper and lower parts of the cold-press section 13.

The hot-press section 11 comprises rollers for hot-press 12 that have a built-in heating device such as an electric heater, such that it can press the laminated media 1 while heating the laminated media 1. Thus the strength of joining the laminated media 1 can be improved because the laminated media are pressed while they are heated. The width of the rollers for hot-press 12 is slightly greater than that of the housing section 24a of the sealing member 24, which will be later explained, so that the entire width of the laminated media 1 can be appropriately pressed.

The cold-press section 13 comprises the rollers for cold-press 14 that have a built-in cooling device such as a piping for cooling the medium, such that the laminated media 1 can be pressed while they are cooled in the process of pressing. In this way the joined laminated media that were joined by pressing at the hot-press section 11 can promptly be cooled so that the joined laminated media that are manufactured can be cooled in a shorter time before they are sent to a next step. So, the efficiency in manufacturing is improved. The rollers for cold-press 14, so as to appropriately press the entire width of the laminated media 1, have a width that is slightly greater than that of the housing section 24a of the sealing member 24.

As shown in FIG. 1(B), there are a plurality of the housing sections 24a and the discharging sections 24b disposed on the sealing member 24 in the direction of the transport of the laminated media 1, wherein the housing sections 24a are compartmentalized spaces that are formed by the endless belt 15b, etc., and in which spaces the laminated media 1 are housed and wherein the discharging sections 24b that communicate with the housing sections 24a discharge the air from the air-tight housing spaces S that are formed by the housing sections 24a and the endless belts 15a, 15b. The sealing member 24 that is sandwiched between the endless belts 15a, 15b acts as the sidewalls of the housing space S. In the present embodiment the sealing member 24 is made of a heat-resistant rubber material, i.e., silicone rubber. Its thickness is designed so that substantially no pressing force weighs on it when the laminated media 1 are pressed to be joined. FIG. 1(B) shows a housing section 24a that is rectangular. But the housing section 24a can have any shape, depending on the shape of the laminated media 1.

The discharging section 24b that communicates with the housing section 24a is formed in the part that protrudes from the housing section 24a in the direction of the width of the endless belts 15a. It has a breadth that is less than that of the housing section 24a in the direction of the movement of the laminated media 1, such that the laminated media 1 housed in the housing section 24a does not move in the direction of the width of the endless belt 15a. Holes for a discharge 17, which go through the endless belt 15a, are formed at the positions on the endless belt 15a that correspond to the discharging sections 24b. The holes for a discharge 17 are parallel to the direction of the movement of the endless belts 15a, 15b, in the areas where the endless belt 15a and the endless belt 15b are opposite to each other and at the positions that are outside the hot-press section 11 and the cold-press section 13 in the direction of the width of the endless belts 15a, 15b.

Figure 2:
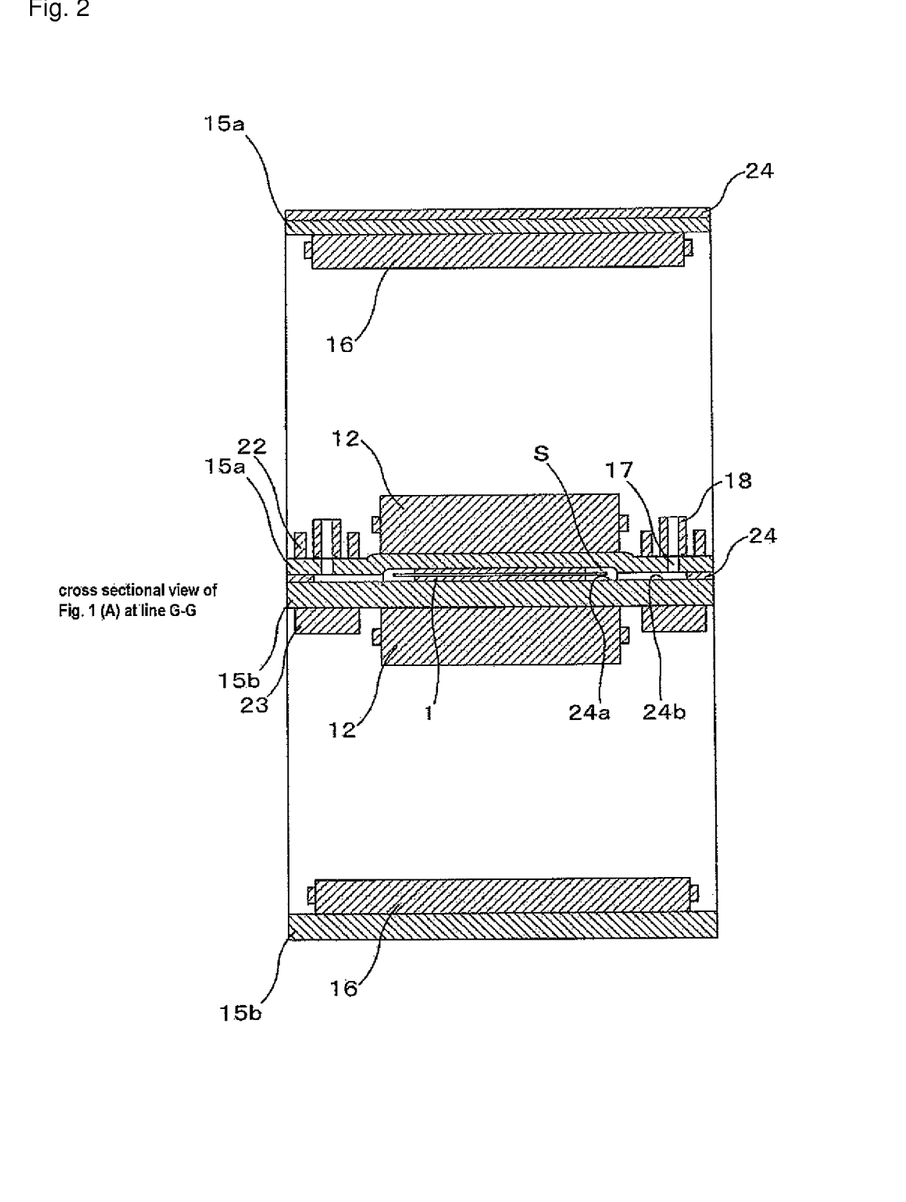
FIG. 2 is a cross sectional view of FIG. 1(A) at line G-G.

As shown in FIG. 1(C) and FIG. 2, the discharging member 18 is an elongated member that covers the holes for a discharge 17 by contacting the endless belt 15a from the inner side of the endless belt 15a, and that has an opening so as to discharge the air through it, at the position where it contacts the endless belt 15a. The discharging member 18 is disposed at position so that the air is discharged from the housing spaces S and so that the housing spaces S are kept under such conditions, at least in the areas, that the laminated media are pressed by the hot-press section 11 and the cold-press section 13. The discharging member 18 is connected to a vacuum pump 21 through a vacuum valve 19 and a vacuum piping 20. The air in the housing space S can be discharged through the discharging section 24b via the hole for a discharge 17.

A first guide rail 22 that guides the pressing of the endless belt 15a downward (corresponding to the "first pressing member" of the second invention) is disposed in the inner side of the endless belt 15a and along the discharging member 18. In the present embodiment the first guide rail 22 is formed as a frame that surrounds the discharging member 18.

By pressing the endless belt 15a downward, the first guide rail 22 can prevent the endless belt 15a from being deformed and thus can prevent the housing spaces S from ceasing to be air-tight, thereby causing a the air to leak, when the air is discharged from the housing space S. In this way the air in the housing space S is discharged and the laminated media 1 are firmly fixed.

The first guide rail 22 and the discharging member 18 can be formed in one body, wherein the structure of the apparatus can be simplified and the size of the apparatus for manufacturing joined laminated media 10 can be made smaller.

A second guide rail 23 (corresponding to the second pressing member of the fourth invention), which is disposed on the inner side of the endless belt 15b, presses the endless belt 15b against the discharging member 18. In this way the first guide rail 22 and the second guide rail 23 press the end parts of the width of the endless belts 15a and 15b, respectively, in the directions that are opposed to each other so that the endless belt 15b is guided to correctly contact the sealing member 24. Also, the endless belt 15a is closely attached to the discharging member 18 such that the air in the housing space S is securely discharged.

Next, the method of manufacturing joined laminated media is explained.

The method can be suitably used for manufacturing the MEA of the polymer electrolyte fuel cell.

Figure 3:
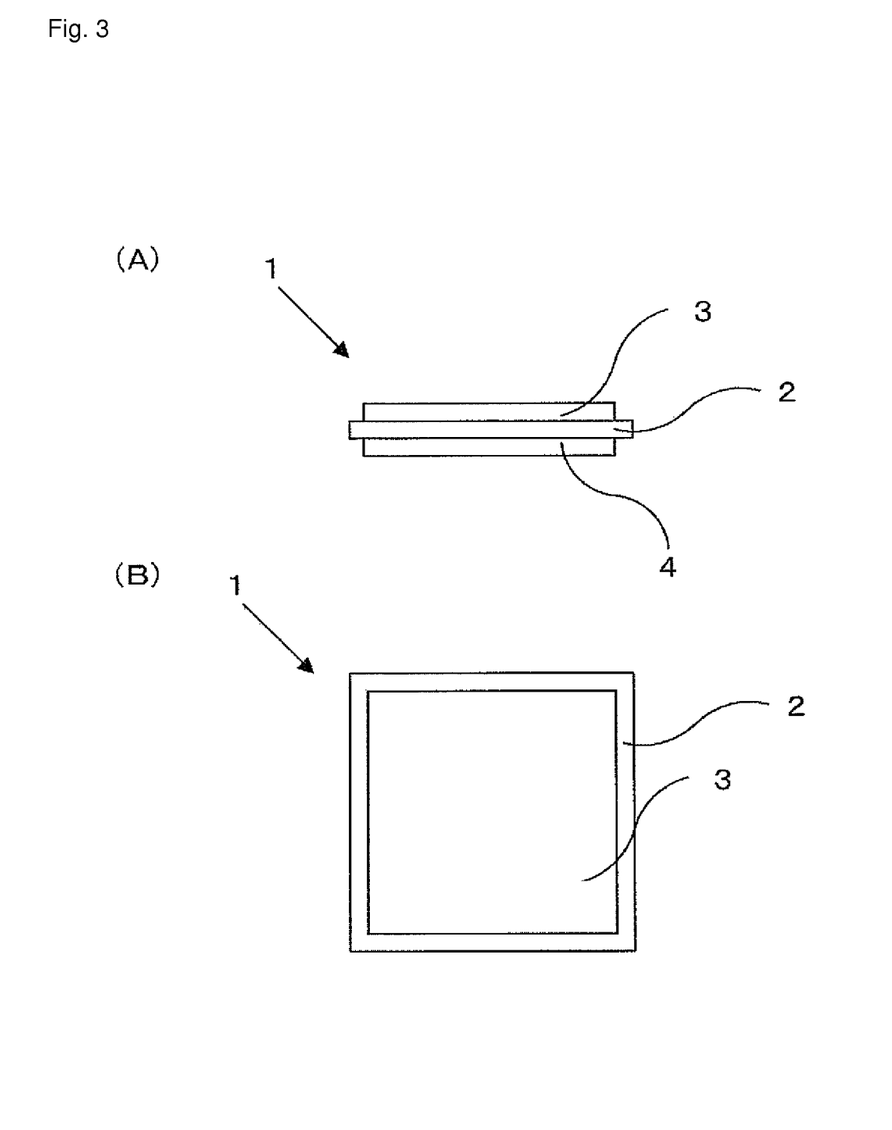
FIG. 3 is an illustration of the structure of the joined laminated media.

First, laminated media 1, which are the layered membrane materials are prepared. As illustrated in FIG. 3, in the present embodiment the laminated media 1 comprise a stack of the membrane materials. From the top they are stacked in the following order: a fuel electrode membrane 3, a polymer electrolyte 2, and an air electrode membrane 4. They all constitute the MEA and are rectangular. The polymer electrolyte 2 is larger than the fuel electrode membrane 3 and the air electrode membrane 4.

For the material that makes up the polymer electrolyte 2, for example, Nafion (registered trademark) of DuPont, Flemion (registered trademark) of Asahi Glass Co., Ltd., or Aciplex (registered trademark) of Asahi-kasei Corporation, etc., can be used. For the material that makes up the fuel electrode membrane 3, for example, a Pt catalyst or ruthenium-Pt catalyst that is supported by a carrier of carbon black such as a carbon paper or a unwoven carbon fabric can be used. For the material that makes up the air electrode membrane 4, for example, a Pt catalyst that is supported by a carrier of carbon black such as a carbon paper or a unwoven carbon fabric can be used.

Figure 4:
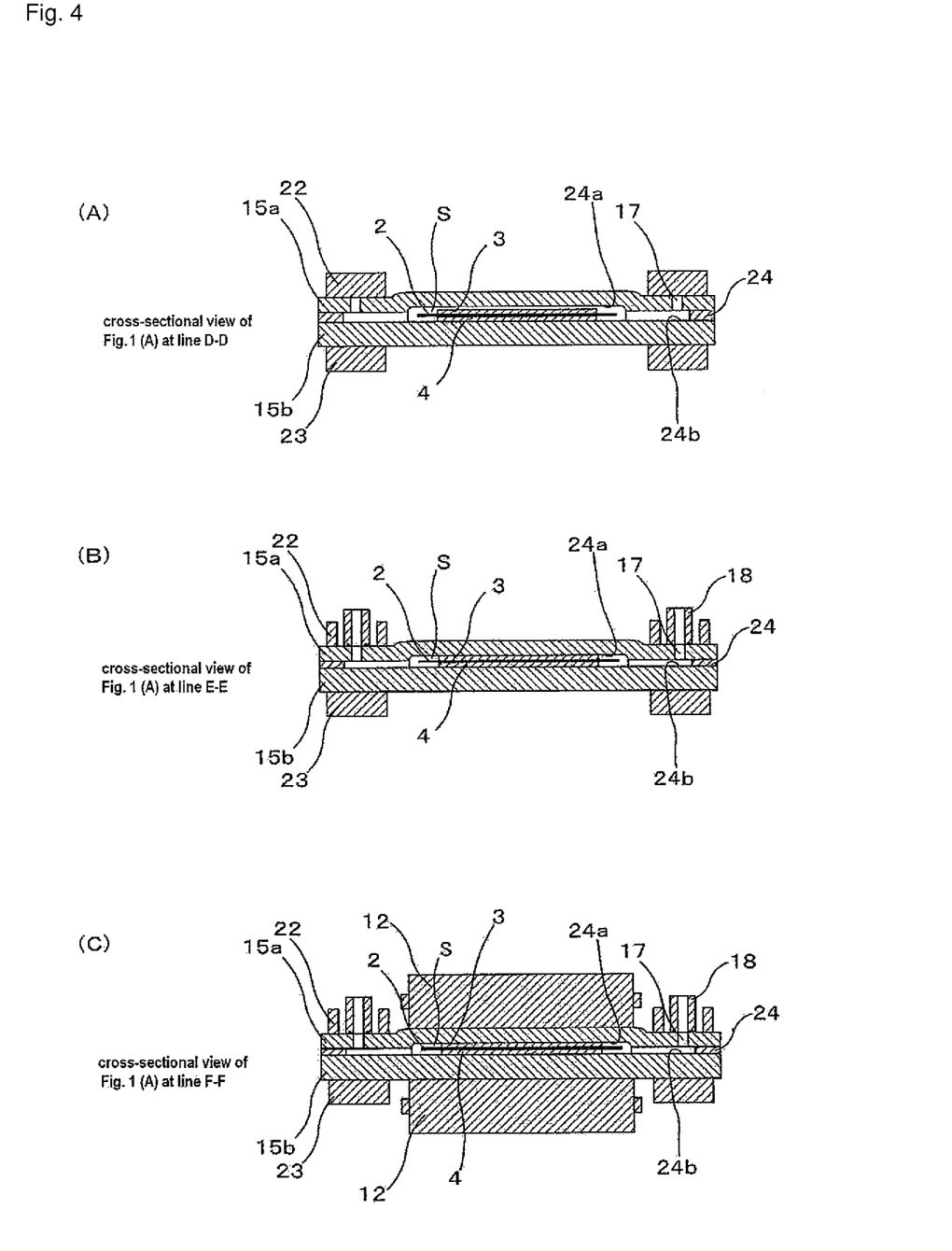
FIG. 4 is an illustration of a process for manufacturing joined laminated media.

In the step of preparing the laminated media, the laminated media 1 are each placed in the housing spaces S. The laminated media are placed at the predetermined positions on the endless belt 15b by a transporting means (not shown). Then when the laminated media 1 that are transported reach the area that is shown by the line D-D in FIG. 1(A), as shown in FIG. 4 the endless belts 15a, 15b are pressed toward the opposing endless belts by the first guide rail 22 and the second guide rail 23, which sandwich the endless belts 15a, 15b. Then the end parts in the width direction of the endless belts 15a, 15b are closely attached to the sealing member 24. In this way the housing spaces S are formed wherein the laminated media 1 are housed.

The predetermined positions where the laminated media 1 are placed correspond to those positions where the housing spaces S are formed by the endless belts 15a, 15b and the sealing member 24, such that each of a plurality of the laminated media 1 is continuously disposed in the housing space S.

In the following step that discharges the air, the air in the housing space S is discharged while the laminated media 1 are being transported, whereby the laminated media 1 are firmly fixed by the endless belts 15a, 15b that are closely attached to the laminated media 1. When the laminated media 1 reach the line E-E of FIG. 1(A) by being transported by the endless belts 15a, 15b, the holes for a discharge 17 face the discharging members 18 as shown in FIG. 4(B). So, the air in the housing spaces S can be discharged through the discharging members 18 via the holes for a discharge 17 such that the endless belts 15a, 15b are closely attached to the laminated media 1, which are then firmly fixed so that they are not affected by any displacement of the positions, deformation, or defect in the joined boundary faces of the laminated media.

In the present embodiment, the endless belt 15b is made of a resin material. So, even if the laminated media 1 were to have a greater thickness, the endless belt 15b would likely be attached flexibly to the laminated media 1 along the contour of the laminated media 1 when the air is discharged from the housing space S. By doing so the laminated media 1 are more firmly fixed.

In the step of pressing that follows, the laminated media 1 that are fixed by being sandwiched between the endless belts 15a, 15b are pressed and joined together. When the laminated media 1 that are transported by the endless belts 15a, 15b reach line F-F of FIG. 1(A), the laminated media 1 are heated and pressed by rollers for hot-press 12 of the hot-press section 11 via the endless belts 15a, 15b, as shown in FIG. 4(C). In this way the fuel electrode membrane 3, polymer electrolyte 2, and air electrode membrane 4, are joined, and the joined laminated media are manufactured.

As the endless belt 15a is made of metal, it has the appropriate strength. Hence it rarely has a deformation such as twists or creases. Also, the endless belt 15a has good heat conductivity, such that it can efficiently transfer the heat from the rollers for hot-press to the laminated media 1, and efficiently heat the laminated media 1.

In the present embodiment, the sealing member 24 has a thickness such that the pressing force of the hot-press section 11 is not substantially applied on the sealing member 24. Namely, the pressing force is entirely applied on the laminated media 1, and thus it is applied efficiently on them.

Then the laminated media 1, which are transported to the cold-press section 13, are pressed by the rollers for cold-press 14 and the joined laminated media are manufactured, which then are transported from the apparatus for manufacturing joined laminated media 10 to a next step. The heat of the laminated media 1 can be efficiently transferred through the endless belt 15a. So, the laminated media 1 can efficiently be cooled. If the MEA is manufactured as the joined laminated media and if the laminated media that were pressed and joined in the hot-press section 11 are cooled while they are being pressed, the joining strength of the MEA is improved compared with that of the MEA that was cooled while they were not pressed. Thus the capacity of a fuel cell that is made of the MEA can be improved.

By the method of manufacturing as discussed above, the joined laminated media can be manufactured in a high yield because it can prevent a displacement of the membrane materials, their deformation, and defects in the joined boundary faces of the laminated media.

Also, even by adopting a method to press and join the laminated media that is fixed by depressurizing the space that houses the laminated media, by the method of the present embodiment a fixed frame need not be separately prepared so as to maintain a vacuum in the space, as was required in the conventional method. So, the method can use, not a batch-type press, but a continuous-type press that is suitable for mass production. So, the joined laminated media can efficiently be manufactured.

A heat-resistant rubber material, particularly silicon rubber, can be used as a sealing member 24. Silicon rubber is highly adhesive, so that it can firmly seal the housing spaces S even if the sealing member 24 is formed to be thin. Even if the laminated media 1 were thin, the sealing member 24 could be formed to be thin so that the laminated media 1 could be firmly fixed. At the same time an excessive pressing force would be prevented from occurring in the hot-press section 11 or cold-press section 13 because the pressing force is borne by the sealing member 24. Also, silicon rubber is highly heat-resistant. So, it can be used when the laminated media 1 are joined by being pressed while they are heated at a high temperature.

If the MEA is manufactured as joined laminated media, the pressure that is charged on the laminated media 1 in the hot-press section 11 or cold-press section 13 is preferably 0.7 to 2.0 MPa in terms of a vertical component force. If the pressure is too low, the joining strength of the MEA is insufficient, and if the pressure is too high, the MEA will be destroyed.

The temperature for heating by the hot-press section 11 is preferably 120 to 180 degrees Celsius, which is the range of the temperature inside the laminated media 1 when it is pressed. If the temperature for heating were too high, the MEA would be damaged by the heat. If the temperature for heating were too low, a sufficient strength in joining the laminated media could not be obtained. This would likely result in a low performance of a fuel cell if the MEA were assembled in the fuel cell.

The temperature for cooling by the cold-press section 13 is preferably in the range of 10 to 40 degrees Celsius, which is the temperature range inside the laminated media 1 when it is pressed. If sufficient cooling were not carried out, a sufficient strength in joining the laminated media could not be obtained. This would likely result in a low performance of a fuel cell if the MEA were assembled in the fuel cell. If the laminated media were to be cooled too low, it would take too long to cool them, resulting in low productivity.

Alternative Example:

In the following example the sealing member 24 is disposed on the endless belt 15a. But the position where the sealing member 24 can be disposed is not limited on the endless belt 15a. It can be disposed on the endless belt 15b or even on both endless belts 15a, 15b.

If the sealing member 24 is to be made of a material that is harder than the laminated media 1, such as a metal that is flexible or a rigid resin, and is thick enough so that the sealing member 24 would not be deformed by the pressing force it receives when the laminated media 1 is pressed, the laminated media 1 can be made to have a thickness that matches the thickness of the sealing member 24. Thus the joined laminated media having a uniform thickness can be manufactured.

Figure 5:
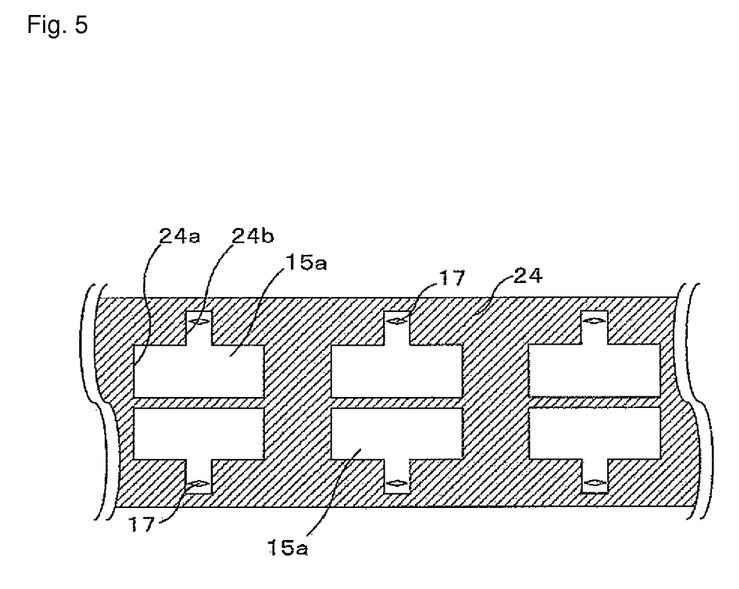
FIG. 5 is a plane view of anther embodiment of the sealing member.

The positions of the housing section 24a and the discharging section 24b of the sealing member 24 are not limited to those described in the above embodiment. They can be suitably selected depending on the positions of the pressing devices. For example, as shown in FIG. 5, the housing sections 24a can be placed in parallel rows along the direction of the transport of the laminated media 1, and the discharging sections 24b can be formed at the parts of the housing space S, which parts are on the outer sides in the direction of the width of the endless belt 15a.

Figure 6:
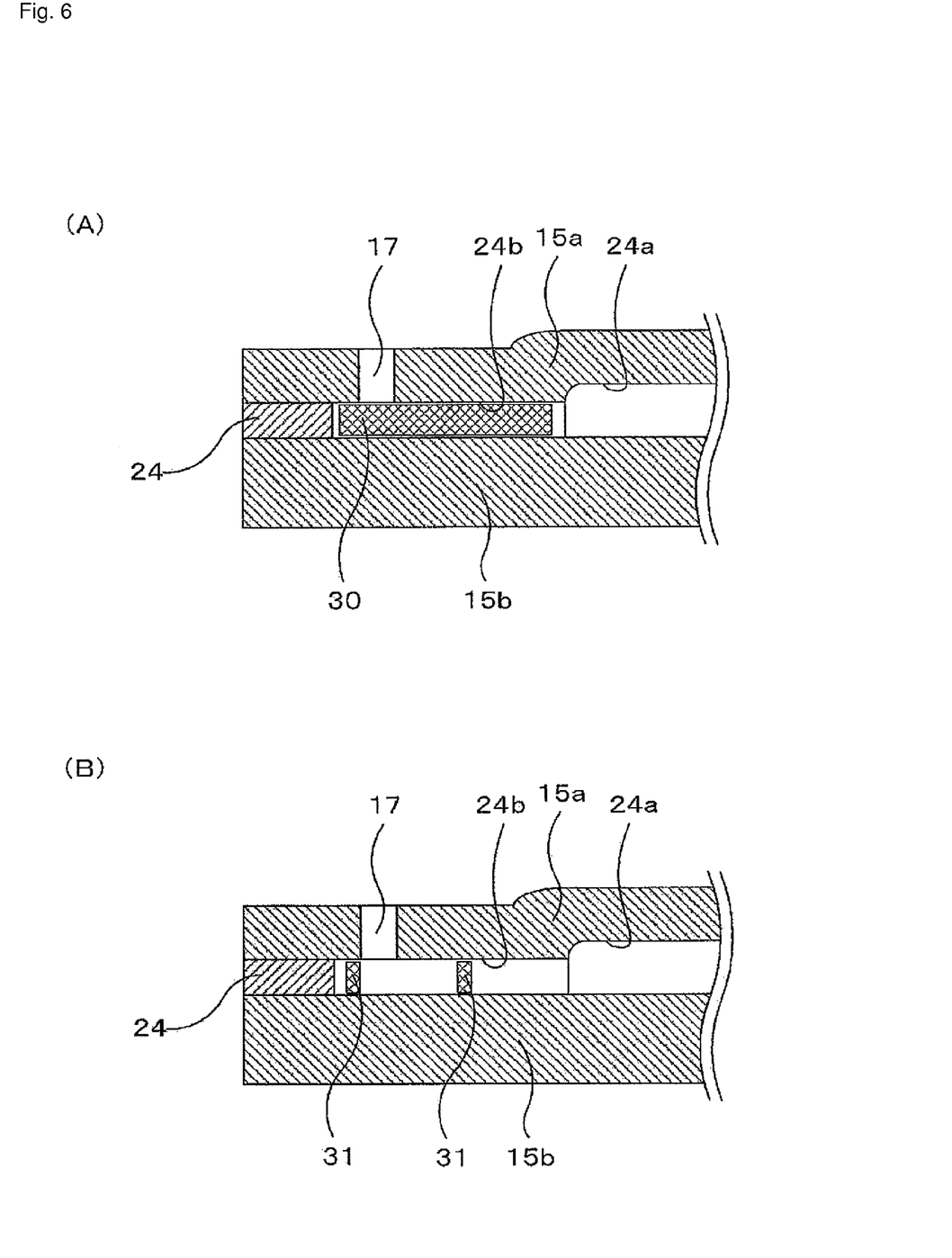
FIG. 6 is a cross-sectional illustrative view of the structure of the spacer that is disposed at the discharging section of the sealing member.

A spacer can be placed in the discharging section 24b. The spacer can prevent the holes for a discharge 17 from being blocked when the air in the housing space S is discharged through the discharging members 18. For example, as shown in FIG. 6(A), a spacer 30 that is made from porous material that has good air permeability, a spacer 30 made of wool, or, as shown in FIG. 6(B) spacers 31 that are the protrusions that surround the holes for a discharge, can be used. In this way, the endless belt 15b can be prevented from being sucked into the holes for a discharge 17 when the air is discharged from the housing space S. So, the holes for a discharge 17 are prevented from being blocked by the endless belt 15b that would otherwise be sucked into the discharging section 24b, so that the air in the housing space S can be smoothly discharged.

In the above embodiment, one hot-press section 11 and one cold-press section 13 were used. But the number of the hot-press sections 11 and the cold-press sections 13 are not limited to the one given in the embodiment and their use or the number of pressing devices can be appropriately modified depending on the joined laminated media that are to be manufactured.

In the present embodiment, for the endless belt 15a a belt made of metal was used and for the endless belt 15b a belt made of resin material was used. But the materials for the endless belts 15a, 15b and their combinations are not limited to those of the embodiment.

Effect of One Embodiment of the Invention

The apparatus for manufacturing joined laminated media 10 and the method of manufacturing joined laminated media in one embodiment of the invention can manufacture the joined laminated media by joining and pressing the laminated media 1 by the hot-press section 11 and the cold-press section 13, wherein the laminated media 1 that consist of laminated layers of membrane materials are placed in the housing spaces S that are formed by a pair of endless belts 15a, 15b, and the sealing member 24, and transported in a state such that the laminated media 1 are firmly fixed by the pair of endless belts 15a, 15b by the air being discharged from the housing spaces S through the holes for a discharge 17.

In this way the laminated media 1 that consist of the layers of membrane materials can be joined together by being pressed, while the laminated media 1 are placed in a fixed state in the housing spaces S by the air being discharged from the housing spaces S. So, joined laminated media that have no displacements of the membrane materials, deformations, or defects in the joined boundary faces of the laminated media can be manufactured in a high yield.

Also, even by adopting a method to press the laminated media that are fixed by depressurizing the spaces that house the laminated media, the method of the present embodiment does not need to separately prepare a fixed frame to maintain a vacuum in the space, as is required in the conventional method. So, the method can use, not a batch-type press, but a continuous press that is suitable for mass production. So, the joined laminated media can be efficiently manufactured.

Example

In this embodiment, the MEA for a polymer electrolyte fuel cell was manufactured. The present invention is not limited to the embodiment of this example.

The polymer electrolyte, which constitutes the MEA, is a sheet that is cut as a rectangle 100 mm L×200 mm W×50 micrometer T. The fuel electrode membrane and air electrode membrane that are used are cut from a sheet 400 micrometer thick, each membrane is a rectangle 92 mm L×192 mm W. In the present example, a sheet from Nafion (registered trademark) of DuPont was used for the polymer electrolyte. A platinum catalyst supported by a carbon paper was used both for the fuel electrode membrane and for the air electrode membrane.

A stainless steel 100 micrometer thick was used for the first endless belt and a belt made from Teflon (registered trademark) 200 micrometer thick was used for the second endless belt. Also, a sheet of silicon rubber 100 micrometer thick was used for the sealing member, which was attached by adhesive to the endless belt made of stainless steel.

The sealing member was cut so that the space formed by it and the endless belts was arranged so that the housing section is a rectangle 110 mm L×210 mm W and so that the discharging section is a rectangle 30 mm L×10 mm W.

First, laminated media were prepared by stacking a fuel electrode membrane, a polymer electrolyte, and an air electrode membrane from top to bottom, in this order. The laminated media were then placed at the predetermined positions so that they would be placed within respective housing spaces S when transported by the endless belts.

Next, the laminated media were joined by being pressed while they were heated after being fixed by the endless belts while the air being discharged from the housing space S. The housing space S was depressurized by a rotary pump through the discharging member to an absolute pressure of $0.113 \times 10^5$ Pa. The vertical component of the pressing force was set at 2.0 MPa. The temperature of the rollers was adjusted so that the temperature of the laminated media would be 160 degrees Celsius when they were pressed.

Then the laminated media that were joined by being pressed in the hot-press section were pressed in the cold-press section while they were cooled. The housing space S was depressurized, the same as in the hot-press section, by a rotary pump, acting through the discharging member, to the absolute pressure of $0.113 \times 10^5$ Pa, which pressure was maintained. The vertical component of the pressing force was set at 2.0 MPa and the temperature of the rollers was adjusted so that the temperatures of the laminated media were lowered to about 20 degrees Celsius immediately after they were pressed.

Through the above steps, the laminated media were joined and the MEA for the polymer electrolyte fuel cell was able to be manufactured.

In the present embodiment a double-belt-type press that uses a plurality of rollers for pressing was used as a pressing device. But the pressing device is not limited to this type of press. A double-belt-type press that presses the endless belts by pressurized fluid can also be used.

The basic Japanese Patent Application, No. JP2010-271494, filed Dec. 6, 2010, is hereby incorporated in its entirety by reference in the present application.

The present invention will become more fully understood from the detailed description of this specification. However, the detailed description and the specific embodiment illustrate desired embodiments of the present invention and are described only for the purpose of explanation. Various possible changes and modifications will be apparent to those of ordinary skill in the art on the basis of the detailed description.

The applicant has no intention to dedicate to the public any disclosed embodiments. Among the disclosed changes and modifications, those that may not literally fall within the scope of the present claims constitute, therefore, a part of the present invention in the sense of the doctrine of equivalents.

The use of the articles "a," "an," and "the," and similar referents in the specification and claims, are to be construed to cover both the singular and the plural, unless otherwise indicated herein or clearly contradicted by the context. The use of any and all examples, or exemplary language (e.g., "such as") provided herein, is intended merely to better illuminate the invention and does not pose a limitation on the scope of the invention unless otherwise claimed.

SYMBOLS 1 laminated media
2 polymer electrolyte
3 fuel electrode membrane
4 air electrode membrane
10 apparatus for manufacturing joined laminated media
11 hot-press section (pressing device)
12 rollers for hot-press section
13 cold-press section (pressing device)
14 rollers for cold-press section
15a, 15b endless belts
16 guide roller
17 hole for a discharge
18 discharging member
19 vacuum valve
20 vacuum piping
21 vacuum pump
22 first guide rail (first pressing member)
23 second guide rail (second pressing member)
24 sealing member
24a housing section
24b discharging section
30, 31 spacer
S housing space

The invention claimed is:

1. An apparatus for manufacturing joined laminated media by joining layers of membrane materials by pressing them, comprising:
a pair of endless belts that transport the laminated media that are sandwiched between the belts;
pressing devices that are disposed at the positions that are opposed to and that sandwich the pair of the endless belts, the pressing devices giving pressing forces by pressing the endless belts on the laminated media that are transported by the endless belts;
a housing section which is a compartmentalized space formed between the endless belts that are opposed to each other such that the laminated media can be placed in the space;
a discharging section that protrudes in the direction of the width of the endless belt and that communicates with the housing section and that is to discharge the air from the spaces, each space compartmentalized by the pair of endless belts and the housing section;
a sealing member that comprises a plurality of the housing sections and discharging sections that are in a line running in the direction of the movements of the endless belts, which sealing member is formed on at least one of the pair of the endless belts; and
a discharging member that discharges the air from the housing space through a hole for a discharge, the hole for a discharge being formed through the endless belt at the position corresponding to the discharging section,
wherein the holes for a discharge are in a line running in the direction of the movements of the endless belts and outside the pressing devices in the width direction of the endless belts, and
wherein the discharging member covers the holes for a discharge by contacting the side of the endless belt which side is opposite to the side of the sealing member, the discharging members being disposed at such positions that the air in the housing space can be kept to be discharged at least for the area where the laminated media are pressed by the pressing devices, and
wherein the pair of endless belts are fixed firmly to the laminated media that are disposed in the housing space by having the air in the housing space discharged by the discharging member through a hole for a discharge, and wherein the laminated media are transported in a fixed position and can be pressed by the pressing devices.

2. The apparatus for manufacturing joined laminated media of claim 1, wherein a first pressing member that is disposed along the discharging member gives a pressing force on the endless belt that has the sealing member and toward the other endless belt.

3. The apparatus for manufacturing joined laminated media of claim 2, wherein the discharging member and the first pressing member are formed in one body.

4. The apparatus for manufacturing joined laminated media of any of claims 1-3 wherein a second pressing member is disposed at the position opposite the discharging member and it gives a pressing force on the endless belt that does not have the discharging member and toward the discharging member.

5. The apparatus for manufacturing joined laminated media of any of claims 1-3 wherein the sealing member is made of heat-resistant rubber material.

6. The apparatus for manufacturing joined laminated media of any of claims 1-3 wherein the sealing member has a thickness such that the pressing force by the pressing devices is not substantially applied on the sealing member.

7. The apparatus for manufacturing joined laminated media of any of claims 1-3 wherein the sealing member is made of material that is harder than that of the laminated media, and has a thickness such that the pressing force by the pressing devices that is applied on the sealing member does not substantially deform the sealing member.

8. The apparatus for manufacturing joined laminated media of any of claims 1-3 wherein a spacer that lets air through is disposed in the discharging section, the spacer preventing the hole for a discharge and the discharging section from being blocked when the air from the housing space is discharged through the discharging member.

9. The apparatus for manufacturing joined laminated media of any of claims 1-3 wherein at least one of the pair of the endless belts is made of metal.

10. The apparatus for manufacturing joined laminated media of any of claims 1-3 wherein at least one of the pair of the endless belts is made of resin material.

11. The apparatus for manufacturing joined laminated media of any of claims 1-3 wherein the pressing devices comprise a heating device that can heat the laminated media.

12. The apparatus for manufacturing joined laminated media of claim 11 wherein the apparatus that has the pressing devices that have the heating device has a cooling device for cooling the laminated media downstream of the pressing device that has the heating device as seen from the direction of the movements of the endless belts.

13. A method of manufacturing joined laminated media using an apparatus for manufacturing joined laminated media, comprising the steps of:

preparing laminated media comprising layers of membrane materials;

placing the laminated media in a housing space formed by a pair of endless belts that transport the laminated media and by a sealing member that is disposed on the surface of at least one of the pair of the endless belts and that compartmentalizes the space between the pair of the endless belts so that the space thus formed can hold the laminated media;

discharging the air in the housing space through the holes for a discharge, the holes for a discharge being formed through the endless belt on which the sealing member is disposed, thereby fixing the laminated media by having the pair of endless belts closely adhere to the laminated media, while the laminated media are being transported; and pressing and joining the laminated media that are firmly fixed in the discharging step.

\* \* \* \* \*